United States Patent  (10) Patent No.: US 10,302,026 B2
Leone et al.  (45) Date of Patent: May 28, 2019

(54) SYSTEMS AND METHODS FOR IMPROVING OPERATION OF A HIGHLY DILUTE ENGINE

(71) Applicant: Ford Global Technologies, LLC, Dearborn, MI (US)

(72) Inventors: Thomas G. Leone, Ypsilanti, MI (US); John D. Russell, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 14/271,248

(22) Filed: May 6, 2014

(65) Prior Publication Data

US 2015/0322904 A1  Nov. 12, 2015

(51) Int. Cl.
F02M 25/10 (2006.01)
F02D 19/06 (2006.01)
(Continued)

(52) U.S. Cl.
CPC ..... F02D 19/0647 (2013.01); F02D 19/0692 (2013.01); F02D 19/081 (2013.01); F02D 41/005 (2013.01); F02D 41/008 (2013.01); F02D 41/0025 (2013.01); F02D 41/0027 (2013.01); F02D 41/0085 (2013.01); F02D 41/1498 (2013.01); F02M 25/10 (2013.01); F02M 26/43 (2016.02); F02D 13/0207 (2013.01); F02D 19/0655 (2013.01); F02D 19/084 (2013.01); F02M 26/16 (2016.02); Y02T 10/36 (2013.01); Y02T 10/47 (2013.01)

(58) Field of Classification Search
CPC ........ F02M 26/01; F02M 26/43; F02M 26/46; F02M 25/0749; F02M 25/0752; F02M 25/0755; F02M 25/10; F02D 19/0692; F02D 19/0649; F02D 19/0655; F02D 19/08; F02D 19/081; F02D 41/0025; F02D 41/0027; F02D 41/006; F02D 41/0062; F02D 41/008; F02D 41/0082; F02D 41/3094; F02D 13/0261
USPC .............. 123/299, 304, 445, 568.11, 568.14, 123/568.21, 575, 672; 701/103, 104
See application file for complete search history.

(56) References Cited

U.S. PATENT DOCUMENTS 4,041,910 A * 8/1977 Houseman ............. F02B 43/10
123/3
4,131,095 A * 12/1978 Ouchi ....................... F02B 1/06
123/3
(Continued)

FOREIGN PATENT DOCUMENTS

WO   WO 2010116064 A1 * 10/2010 ........... F02D 19/081
WO   2014005127 A2    1/2014
WO   WO 2014189524 A1 * 11/2014 ......... F02M 21/0284

OTHER PUBLICATIONS

Ulrey, Joseph N. et al., "Dedicated EGR Cylinder Post Combustion Injection," U.S. Appl. No. 13/915,445, filed Jun. 11, 2013, 34 pages.

(Continued)

Primary Examiner — John M Zaleskas
(74) Attorney, Agent, or Firm — Julia Voutyras; McCoy Russell LLP

(57) ABSTRACT

Systems and methods for improving combustion in a highly exhaust gas diluted engine are disclosed. The methods and systems may be provided in an engine that is supplied two different types of fuel.

18 Claims, 7 Drawing Sheets

(51) Int. Cl.
| | | |
|---|---|---|
| F02D 19/08 | (2006.01) | |
| F02D 41/00 | (2006.01) | |
| F02D 41/14 | (2006.01) | |
| F02M 26/43 | (2016.01) | |
| F02D 13/02 | (2006.01) | |
| F02M 26/16 | (2016.01) | |

(56) References Cited

U.S. PATENT DOCUMENTS

| | | | |
|---|---|---|---|
| 5,279,515 A | 1/1994 | Moore et al. | |
| 5,297,515 A * | 3/1994 | Gale | F02M 27/02 123/3 |
| 5,339,634 A * | 8/1994 | Gale | F02M 27/02 431/7 |
| 5,746,189 A | 5/1998 | Kuzuya et al. | |
| 6,053,154 A | 4/2000 | Pott | |
| 6,138,650 A | 10/2000 | Bailey | |
| 6,230,683 B1 * | 5/2001 | zur Loye | F02B 1/12 123/27 GE |
| 6,230,695 B1 | 5/2001 | Coleman et al. | |
| 6,286,482 B1 * | 9/2001 | Flynn | F02B 1/12 123/25 C |
| 6,286,489 B1 * | 9/2001 | Bailey | F02D 41/0047 123/568.11 |
| 6,293,246 B1 | 9/2001 | Tanahashi et al. | |
| 6,397,790 B1 | 6/2002 | Collier, Jr. | |
| 6,405,720 B1 | 6/2002 | Collier, Jr. | |
| 6,499,449 B2 | 12/2002 | Michelini et al. | |
| 6,543,230 B1 | 4/2003 | Schmid | |
| 6,655,324 B2 | 12/2003 | Cohn et al. | |
| 6,820,415 B2 | 11/2004 | Abet et al. | |
| 6,915,776 B2 * | 7/2005 | zur Loye | F02B 1/12 123/304 |
| 6,925,802 B2 | 8/2005 | Arnold | |
| 6,968,825 B2 | 11/2005 | Hitomi et al. | |
| 7,290,504 B2 | 11/2007 | Lange | |
| 7,779,812 B2 | 8/2010 | Leone et al. | |
| 7,942,127 B2 | 5/2011 | Leone et al. | |
| 8,041,500 B2 | 10/2011 | Leone | |
| 8,108,125 B2 | 1/2012 | Leone | |
| 8,150,605 B2 | 4/2012 | Doering et al. | |
| 8,239,122 B2 | 8/2012 | Leone et al. | |
| 8,291,891 B2 | 10/2012 | Alger, II et al. | |
| 8,352,160 B2 | 1/2013 | Leone | |
| 8,352,164 B2 | 1/2013 | Leone et al. | |
| 8,511,084 B2 | 8/2013 | Ulrey et al. | |
| 8,539,768 B2 | 9/2013 | Hayman et al. | |
| 8,561,599 B2 | 10/2013 | Gingrich et al. | |
| 8,701,409 B2 | 4/2014 | Pursifull et al. | |
| 8,733,081 B2 * | 5/2014 | Miyashita | F02M 26/43 123/568.11 |
| 8,763,570 B2 | 7/2014 | Hayman et al. | |
| 2005/0016496 A1 | 1/2005 | Hitomi et al. | |
| 2009/0095546 A1 * | 4/2009 | Zubeck | F02B 1/02 180/54.1 |
| 2009/0308070 A1 * | 12/2009 | Alger, II | F02D 13/0238 60/602 |
| 2010/0101529 A1 * | 4/2010 | Lewis | F02D 41/0025 123/299 |
| 2010/0174470 A1 * | 7/2010 | Bromberg | F02B 17/00 701/103 |
| 2010/0206249 A1 * | 8/2010 | Bromberg | F02B 17/00 123/3 |
| 2010/0318277 A1 * | 12/2010 | Pursifull | F02D 13/0203 701/103 |
| 2010/0318284 A1 * | 12/2010 | Surnilla | F02B 17/005 701/113 |
| 2011/0041495 A1 | 2/2011 | Yager | |
| 2011/0253113 A1 | 10/2011 | Roth et al. | |
| 2012/0023937 A1 | 2/2012 | Styles et al. | |
| 2012/0078492 A1 | 3/2012 | Freund et al. | |
| 2012/0204844 A1 * | 8/2012 | Gingrich | F02B 27/0215 123/568.11 |
| 2012/0206897 A1 | 10/2012 | Hayman et al. | |
| 2012/0260897 A1 * | 10/2012 | Hayman | F02D 41/005 123/568.2 |
| 2012/0285163 A1 | 11/2012 | Hayman et al. | |
| 2012/0285426 A1 | 11/2012 | Hayman et al. | |
| 2012/0285427 A1 | 11/2012 | Hayman et al. | |
| 2013/0030672 A1 * | 1/2013 | Klingbeil | F02D 41/0085 701/109 |
| 2013/0061575 A1 * | 3/2013 | Korenaga | F02D 41/0065 60/278 |
| 2013/0104542 A1 * | 5/2013 | Klingbeil | F02B 33/44 60/605.2 |
| 2013/0133616 A1 * | 5/2013 | Klingbeil | F02M 25/0749 123/304 |
| 2013/0152908 A1 * | 6/2013 | Choi | F02D 41/0065 123/568.11 |
| 2013/0152909 A1 * | 6/2013 | Choi | F02D 41/0065 123/568.12 |
| 2013/0311066 A1 * | 11/2013 | Guimaraes | F02D 41/3094 701/104 |
| 2014/0014075 A1 * | 1/2014 | Yager | F02D 41/0047 123/568.11 |
| 2014/0033705 A1 * | 2/2014 | Blythe | F02D 41/0065 60/605.2 |
| 2014/0034014 A1 * | 2/2014 | Blythe | F02D 41/1497 123/435 |
| 2014/0190458 A1 * | 7/2014 | Gingrich | F02B 47/08 123/568.2 |
| 2014/0196702 A1 * | 7/2014 | Gingrich | F02D 41/0065 123/568.21 |
| 2014/0196703 A1 * | 7/2014 | Boyer | F02M 25/07 123/568.21 |
| 2014/0238363 A1 * | 8/2014 | Keating | F02M 25/077 123/568.17 |
| 2014/0261322 A1 * | 9/2014 | Geckler | F02D 41/0065 123/445 |
| 2014/0360461 A1 * | 12/2014 | Ulrey | F02M 26/43 123/299 |
| 2015/0159588 A1 * | 6/2015 | Geckler | F02M 25/07 123/672 |
| 2015/0192078 A1 * | 7/2015 | Martin | F02D 41/005 123/568.17 |
| 2015/0226159 A1 * | 8/2015 | Jayakar | F02M 35/10295 60/278 |
| 2015/0337696 A1 * | 11/2015 | Glugla | F01M 13/00 123/574 |
| 2015/0354477 A1 * | 12/2015 | Leone | F02D 41/0002 123/406.26 |
| 2015/0354482 A1 * | 12/2015 | Leone | F02D 41/0065 123/568.21 |
| 2015/0361927 A1 * | 12/2015 | Glugla | F02M 25/0749 60/603 |

OTHER PUBLICATIONS

Potteau, Sebastian et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

Alger, Terry et al., "Dedicated EGR: A New Concept in High Efficiency Engines," SAE Technical Paper Series No. 2009-01-0694, Southwest Research Institute, 12 pages.

Boyer, Brad A. et al., "Devices and Methods for Exhaust Gas Recirculation Operation of an Engine," U.S. Appl. No. 13/744,281, filed Jan. 17, 2013, 33 pages.

Leone, Thomas G. et al., "Systems and Methods for Dedicated EGR Cylinder Valve Control," U.S. Appl. No. 14/298,733, filed Jun. 5, 2014, 36 pages.

Leone, Thomas G. et al., "Systems and Methods for EGR Control," U.S. Appl. No. 14/298,733, filed Jun. 6, 2014, 45 pages.

Glugla, Chris P., "Systems and Methods for Boost Control," U.S. Appl. No. 14/307,165, filed Jun. 17, 2014, 56 pages.

(56) References Cited

OTHER PUBLICATIONS

Martin, Douglas R. et al., "Method and System for EGR Control," U.S. Appl. No. 14/327,379, filed Jul. 9, 2014, 48 pages.

* cited by examiner

SYSTEMS AND METHODS FOR IMPROVING OPERATION OF A HIGHLY DILUTE ENGINE

FIELD

The present description relates to systems and methods for improving operation of an engine that operates with high levels of exhaust gas recirculation (EGR). The methods may be particularly useful for engines that include a dedicated EGR cylinder that provides external EGR to other engine cylinders.

BACKGROUND AND SUMMARY

An engine may be operated diluted with EGR to improve engine fuel economy and emissions. The engine may be operated less throttled when EGR flow is increased to engine cylinders; however, combustion stability of the engine may degrade. Engine combustion stability may degrade due to slower combustion, decreased ignitability, variation in the amount of EGR supplied to engine cylinders, and variations in engine operating conditions where the present EGR flow rate was determined. For example, intake air temperature may increase or decrease, ambient humidity may increase or decrease, fuel octane may vary, and the commanded EGR flow rate may not be exactly the EGR flow rate produced. Therefore, it may be desirable to develop a way of providing stable engine combustion in the presence of high levels of dilution even when operating variables may vary.

The inventors herein have recognized the above-mentioned disadvantages of operating a highly diluted engine and have developed an engine operating method, comprising: injecting a lower hydrogen concentration fuel to a group of cylinders; and; increasing a fuel injection amount of a higher hydrogen concentration fuel to one or more dedicated EGR cylinders in response to combustion stability in the group of cylinders being less than a desired combustion stability.

By increasing an amount of higher hydrogen concentration fuel injected into a cylinder that supplies exhaust gas to other engine cylinders, it may be possible to improve engine combustion stability for an engine that operates with a higher level of exhaust gas dilution. For example, an air-fuel ratio of a dedicated EGR cylinder (e.g., a cylinder that directs at least a portion of its exhaust flow, without exhaust from other cylinders, to provide external EGR to engine cylinders) may be richened to an air-fuel ratio that is richer than a stoichiometric air-fuel ratio of the gaseous air-fuel mixture combusted in the dedicated EGR cylinder to produce excess hydrogen in the dedicated EGR cylinder's exhaust gas. The exhaust gas from the dedicated EGR cylinder may be provided to other engine cylinders where the excess hydrogen may improve combustion stability. And, since the fuel supplied to the dedicated EGR cylinder has a higher hydrogen concentration, higher levels of excess hydrogen may be supplied in the exhaust gas as compared to if a same lower hydrogen concentration fuel combusted in the engine's remaining cylinders were combusted in the dedicated EGR cylinder. In this way, it may be possible to operate a highly EGR diluted engine with a desired level of combustion stability.

The present description may provide several advantages. Specifically, the approach may improve combustion stability of a highly EGR diluted engine. Further, the approach may provide a simplified cost effective way of improving engine combustion stability. Further still, the approach may allow an engine to operate more efficiently and stable at light loads and low engine speeds.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating an engine with highly diluted cylinder mixtures. The engine cylinder mixtures may be diluted using recirculated exhaust gases that are byproducts of combusting air-fuel mixtures. The recirculated exhaust gases may be referred to as EGR. FIGS. 1-4 show example engine configurations that may be operated at higher cylinder charge dilution levels. The fuel systems shown in FIGS. 5 and 6 may enable the engine to operate at higher cylinder charge dilution levels. The method of FIGS. 7 and 8 may allow an engine to operate at higher cylinder charge dilution levels with a desirable level of engine combustion stability.

Figure 1:
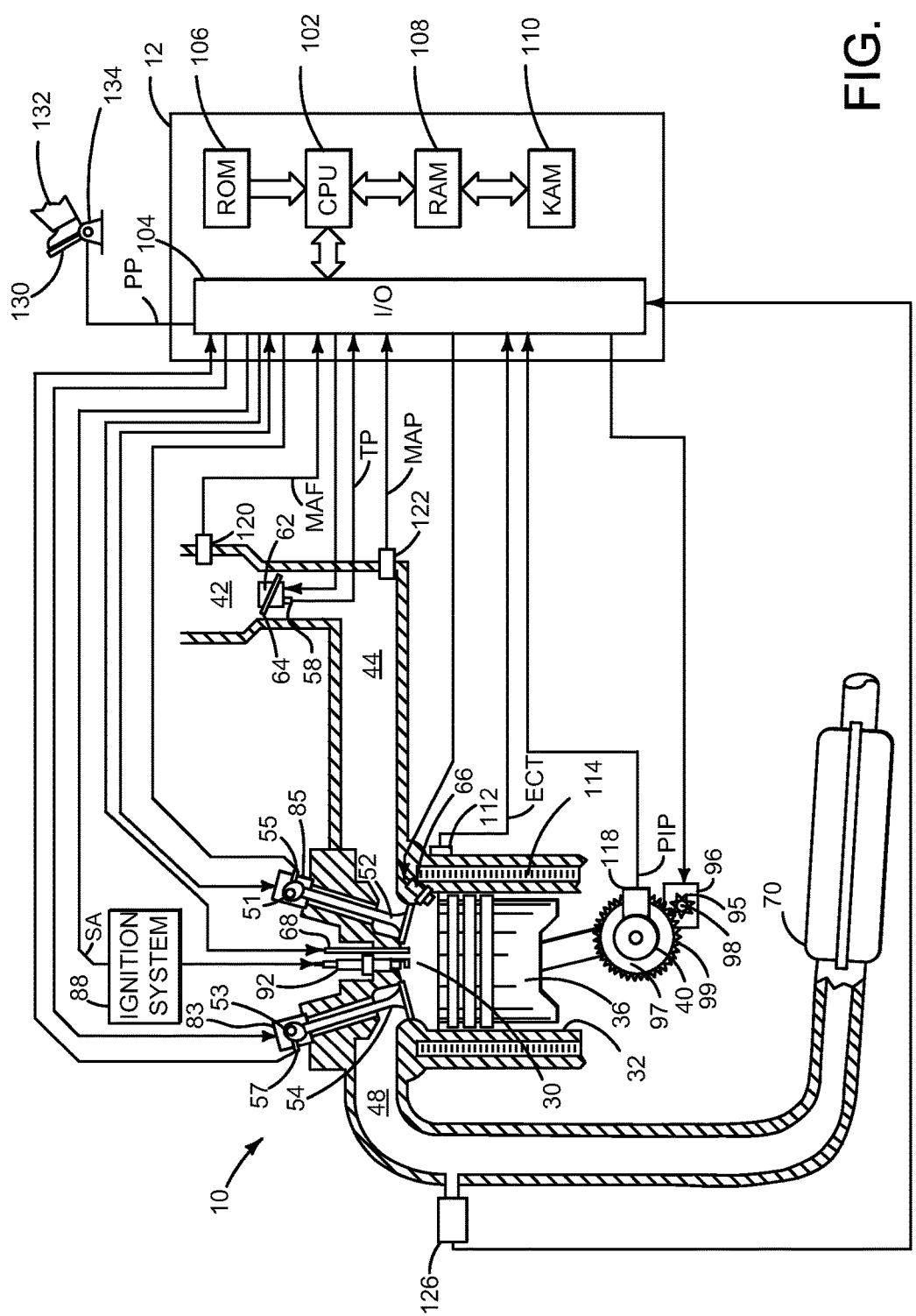
FIG. 1 is a schematic diagram of an engine.
Figure 2:
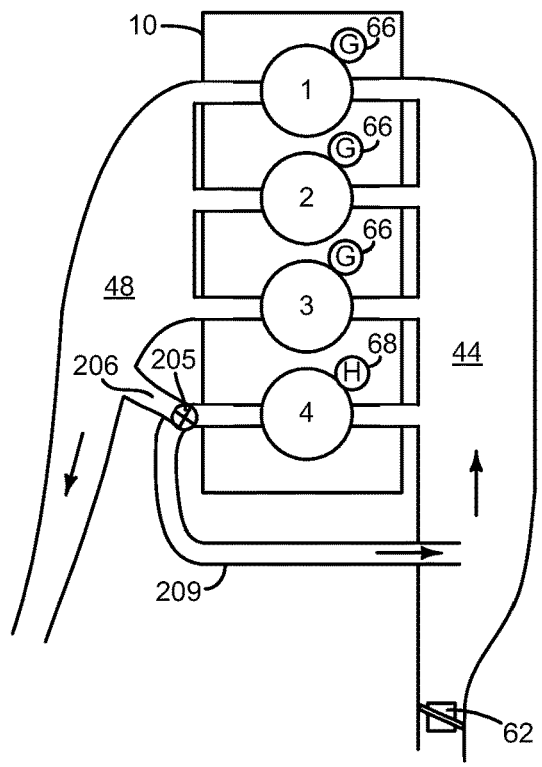
FIGS. 2-4 show example variations of the engine that may exhibit improved combustion stability at higher EGR flow rates.
Figure 3:
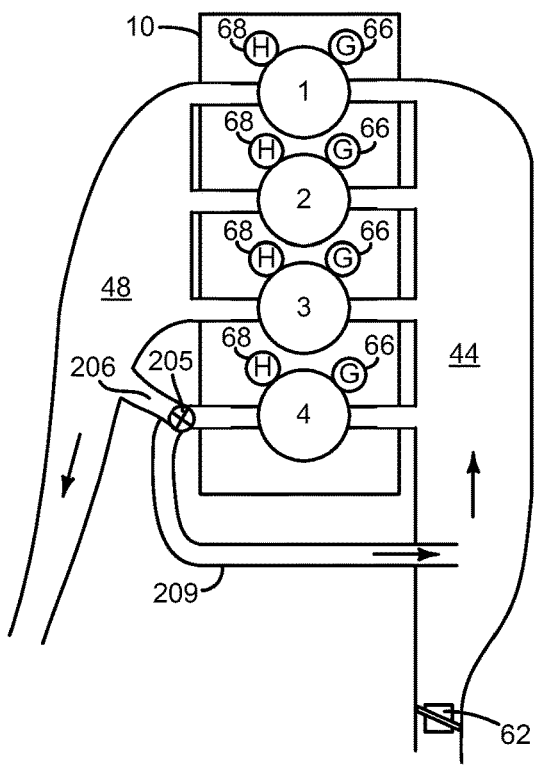
Figure 4:
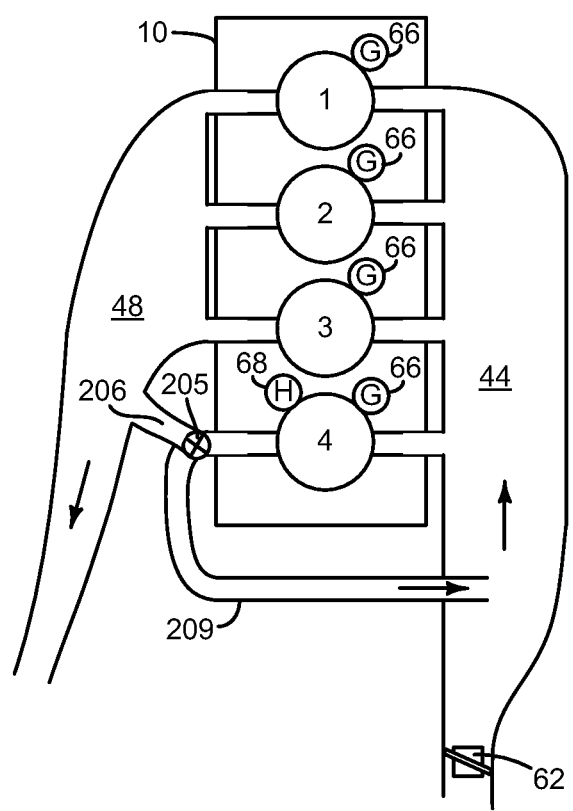

Referring to FIG. 1, internal combustion engine 10, comprising a plurality of cylinders as shown in FIGS. 2-4, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated independently by an intake cam 51 and an exhaust cam 53. Intake valve adjuster 85 advances or retards the phase of intake valve 52 relative to a position of crankshaft 40. Additionally, intake valve adjuster 85 may increase or decrease an intake valve lift amount. Exhaust valve adjuster 83 advances or retards the phase of exhaust valve 54 relative to a position of crankshaft 40. Further, Exhaust valve adjuster 83 may increase or decrease an exhaust valve lift amount. The position of intake cam 51 may be determined by intake cam sensor 55. The position of exhaust cam 53 may be determined by exhaust cam sensor 57. In cases where combustion chamber 30 is part of a dedicated EGR cylinder, the timing and/or lift amount of valves 52 and 54 may be adjusted independently of other engine cylinders so that the cylinder air charge of the dedicated EGR cylinder may be increased or decreased relative to other engine cylinders. In this way, external EGR supplied to engine cylinders may exceed twenty five percent of the cylinder charge mass. External EGR is exhaust that is pumped out of exhaust valves of a cylinder and returned to cylinders via cylinder intake valves. Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Low hydrogen concentration fuel injector 66 is shown positioned to inject low hydrogen concentration fuel directly into cylinder 30, which is known to those skilled in the art as direct injection. Alternatively, low hydrogen concentration fuel may be injected to an intake port, which is known to those skilled in the art as port injection. Low hydrogen concentration fuel injector 66 supplies a fuel having a relatively low number of hydrogen atoms to combustion chamber 30 (e.g., gasoline). Higher hydrogen concentration fuel injector 68 supplies a fuel having a relatively high number of hydrogen atoms to combustion chamber 30 (e.g., $CH_4$). High hydrogen concentration fuel injector 68 may supply liquid or gaseous fuel to combustion chamber 30. In some example engine configurations shown herein, some engine cylinders may receive fuel from only one low hydrogen concentration fuel injector 66 or from only one high hydrogen concentration fuel injector 68. In other example engine configurations, engine cylinders may receive fuel from both types of fuel injectors 66 and 68.

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle. Driver demand torque may be determined from a position of accelerator pedal 130 as sensed by accelerator pedal sensor 134. A voltage or current indicative of driver demand torque is output from accelerator pedal sensor 134 when driver's foot 132 operates accelerator pedal 130.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows a schematic of a first example of engine 10 showing cylinders 1-4, one of which includes combustion chamber 30 of FIG. 1. The example engine configuration of FIG. 2 may include the devices shown in FIG. 1 for each engine cylinder. The engine configuration shown in FIG. 2 may be supplied fuel via one of the fuel systems shown in FIGS. 5 and 6. Further, the engine configuration of FIG. 2 may be operated according to the method of FIGS. 7 and 8.

Throttle 62 regulates air flow into intake manifold 44, and intake manifold 44 supplies air to each cylinders 1-4. Fuel is supplied to each cylinder via respective fuel injectors 66 and 68. In this example, cylinder number four receives fuel solely via high hydrogen concentration fuel injector 68 while cylinders 1-3 receives fuel solely via low hydrogen concentration fuel injectors 66. Exhaust from cylinders 1-3 is directed to exhaust manifold 48 before being processed by a catalyst. Exhaust from cylinder 4 is routed to intake manifold 44 via valve 205 and passage 209, or alternatively, to exhaust manifold 48 via valve 205 and passage 206. In some examples, valve 205 and passage 206 may be omitted.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from cylinder 4 and passage 209. In another example, external EGR may only be provided to cylinders 1-3 and not to cylinder 4. External EGR is not provided by exhaust flow from cylinders 1-3. Thus, in this example, cylinder 4 is the sole source of external EGR for engine 10. A hydrogen concentration in external EGR from cylinder 4 may be increased via enriching an air-fuel mixture combusted in cylinder 4.

Referring now to FIG. 3, a schematic of a second example of engine 10 showing cylinders 1-4 is shown. One of cylinders 1-4 includes combustion chamber 30 of FIG. 1, and the remaining cylinders may include similar devices. The example engine configuration of FIG. 3 may include the devices shown in FIG. 1 for each engine cylinder. The engine configuration shown in FIG. 3 may be supplied fuel via one of the fuel systems shown in FIGS. 5 and 6. Further, the engine configuration of FIG. 3 may be operated according to the method of FIGS. 7 and 8.

FIG. 3 includes many of the same devices and components described in FIG. 2. Therefore, for the sake of brevity, the description of like devices and components is omitted. However, the devices and components operate and perform as described in FIG. 2.

In the example of FIG. 3, engine 10 includes two fuel injectors for each of cylinders 1-4. Specifically, each cylinder includes a high hydrogen concentration fuel injector 68 and a low hydrogen concentration fuel injector 66. A ratio of fuel injected to each cylinder from fuel injector 68 and fuel injector 66 may be adjusted depending on engine speed, torque demand, and other operating conditions. In some examples, the high hydrogen concentration fuel may be injected to reduce the possibility of engine knock or to reduce engine knock after engine knock is sensed. Additionally, a hydrogen concentration in the external EGR may be increased via enriching an air-fuel mixture combusted in cylinder 4 via fuel injector 68 to richer than stoichiometric conditions.

Referring now to FIG. 4, a schematic of a third example of engine 10 showing cylinders 1-4 is shown. One of cylinders 1-4 includes combustion chamber 30 of FIG. 1. The example engine configuration of FIG. 4 may include the devices shown in FIG. 1 for each cylinder. The engine configuration shown in FIG. 4 may be supplied fuel via one of the fuel systems shown in FIGS. 5 and 6. Further, the engine configuration of FIG. 4 may be operated according to the method of FIGS. 7 and 8.

FIG. 4 includes many of the same devices and components described in FIG. 2. Therefore, for the sake of brevity, the description of like devices and components is omitted. However, the devices and components operate and perform as described in FIG. 2.

In the example of FIG. 4, engine 10 includes two fuel injectors for cylinder 4 and one fuel injector for each of cylinders 1-3. In particular, cylinders 1-3 include a low hydrogen concentration fuel injector 66 and cylinder 4 includes a high hydrogen concentration fuel injector 68 and a low hydrogen concentration fuel injector 66. The amount fuel injected in cylinders 1-3 is based on engine speed, driver demand torque, and other operating conditions. A ratio of fuel injected to cylinder 4 from fuel injector 68 and fuel injector 66 may be adjusted depending on engine speed, torque demand, and other operating conditions. In some examples, the high hydrogen concentration fuel may be injected to cylinder 4 when engine combustion stability is less than desired. This action increases hydrogen concentration in external EGR and it may improve engine combustion stability, especially at lower engine speeds and loads (e.g., idle).

Figure 5:
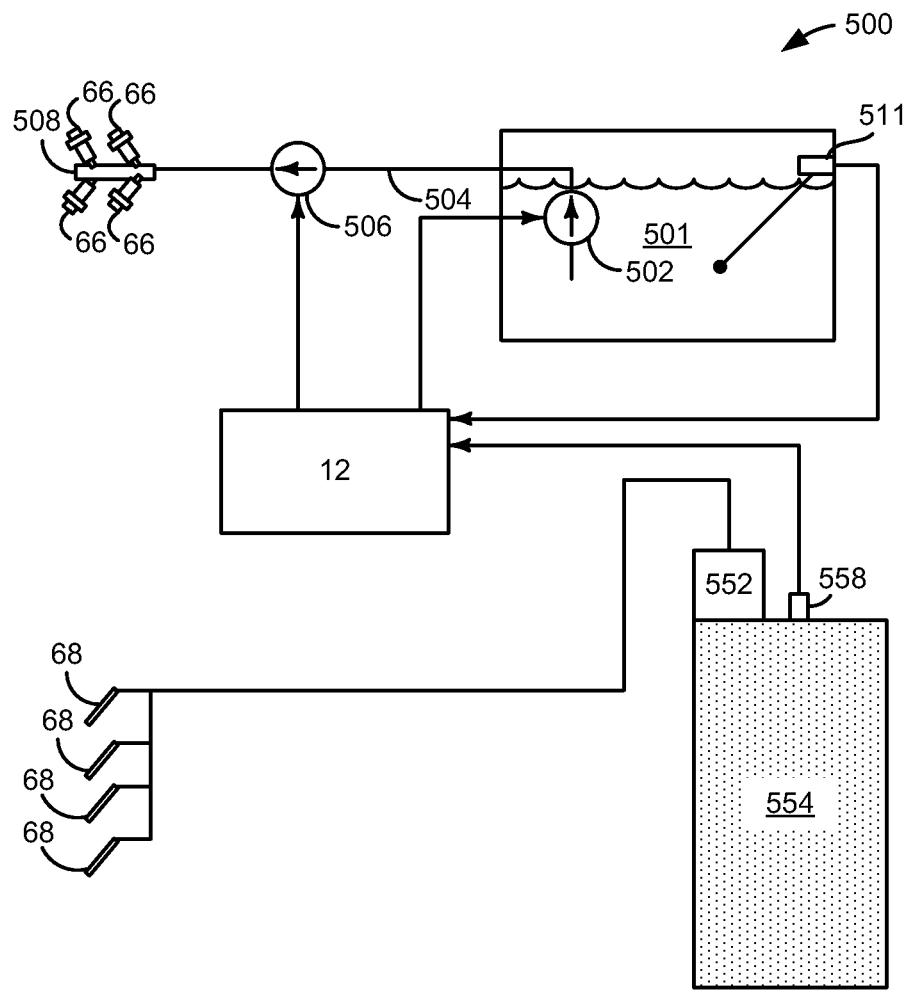
FIGS. 5 and 6 show schematics of example fuel systems for supplying fuel to the engines shown in FIGS. 1-4.

Referring now to FIG. 5, an example fuel system for supplying fuel to engine 10 of FIGS. 1-4 is shown. The fuel system of FIG. 5 may be operated according to the method of FIGS. 7 and 8.

Fuel system 500 includes a liquid fuel tank 501 and a gaseous fuel tank 554. The liquid fuel tank 501 may store gasoline, alcohol, or a mixture of gasoline and alcohol. The gaseous fuel tank 554 may store compressed natural gas (CNG), liquid propane gas (LPG which changes state to a gas upon injection), hydrogen, or other gaseous fuel.

Liquid fuel tank 501 includes a fuel level sensor 511 and a fuel pump 502. Fuel pump 502 may be electrically driven via a command from controller 12. Fuel pump 502 may be a low pressure fuel pump and it supplies fuel to high pressure fuel pump 506 via conduit 504. High pressure fuel pump 506 supplies fuel to fuel rail 508 and it distributes fuel to fuel injectors 66. High pressure fuel pump 506 may be driven by engine 10. Controller 12 may adjust an amount of fuel pumped by high pressure fuel pump 306 in response to fuel rail pressure.

Gaseous fuel tank 554 includes a pressure sensor 558 for judging an amount of fuel stored in fuel tank 554. Regulator 552 adjusts fuel pressure from fuel tank 554 to a constant pressure when fuel pressure in fuel tank 554 is greater than a threshold pressure. Regulator 552 directs gaseous fuel to fuel injectors 68.

Figure 6:
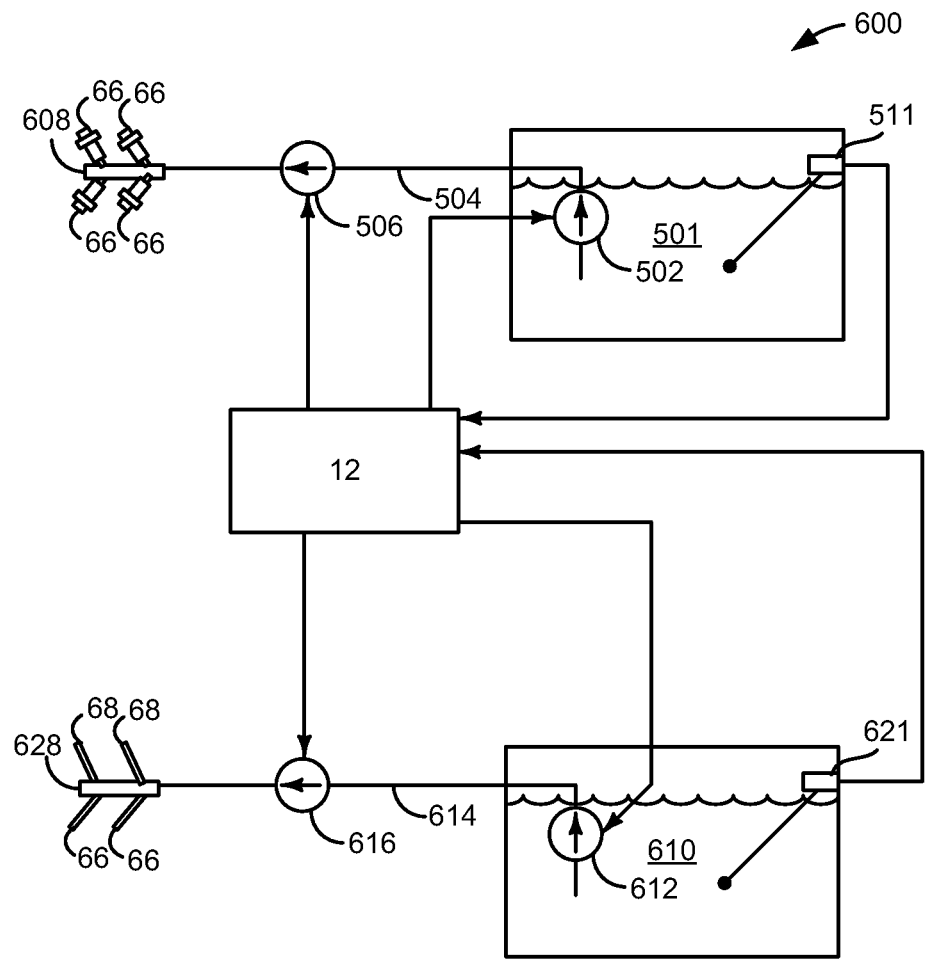

Referring now to FIG. 6, a second example fuel system for supplying fuel to engine 10 of FIG. 1 is shown. The fuel system of FIG. 6 may be operated according to the method of FIGS. 7 and 8. The fuel system of FIG. 6 includes many of the same components as the fuel system of FIG. 5. Like components between FIG. 5 and FIG. 6 are included in FIG. 6 using the same numeric identifiers. Therefore, for the sake of brevity, the description of like components is omitted from the description of FIG. 6. However, like components operate as described in FIG. 5.

Fuel system 600 includes a second liquid fuel tank 610. The second liquid fuel tank 610 may store gasoline, an alcohol (such as methanol, ethanol, or butanol), or a mixture of gasoline and alcohol, or some other liquid fuel which has a higher hydrogen concentration than gasoline. Second liquid fuel tank 610 includes a fuel level sensor 621 and a fuel pump 612. Fuel pump 612 may be electrically driven via a command from controller 12. Fuel pump 612 may be a low pressure fuel pump and it supplies fuel to high pressure fuel pump 616 via conduit 614. High pressure fuel pump 616 supplies fuel to fuel rail 628 and it distributes fuel to fuel injectors 68. High pressure fuel pump 616 may be driven by engine 10. Controller 12 may adjust an amount of fuel pumped by high pressure fuel pump 616 in response to fuel rail pressure.

Thus, the system of FIGS. 1-6 provides for a vehicle system, comprising: an engine; a first fuel tank storing a lower hydrogen concentration fuel; a second fuel tank storing a higher hydrogen concentration fuel; a group of fuel injectors supplying the lower hydrogen concentration fuel to a group of cylinders; a fuel injector supplying the higher hydrogen concentration fuel to one or more dedicated EGR cylinders, the dedicated EGR cylinder not in the group of cylinders; and a controller including non-transitory instructions for increasing a concentration of hydrogen in exhaust gas (EGR) supplied to the group of cylinders via increasing an amount of the higher hydrogen concentration fuel supplied to the one or more dedicated EGR cylinders. The vehicle system includes where the one or more dedicated EGR cylinders is a dedicated EGR cylinder supplying exhaust gas externally to the group of cylinders, the exhaust gas not including exhaust gas from other cylinders besides the dedicated EGR cylinder.

In some examples the system includes where the concentration of hydrogen in the exhaust gas is increased via increasing an amount of fuel injected to the one or more dedicated EGR cylinders. The vehicle system further comprises instructions for adjusting spark timing in response to the concentration of hydrogen in the exhaust gas. The vehicle system further comprises an intake manifold coupled to the engine and a passage allowing pneumatic communication between the one or more dedicated EGR cylinders and the passage not allowing pneumatic communication between the intake manifold and the group of cylinders. The vehicle system further comprises instructions for adjusting internal exhaust gas recirculation in the group of cylinders in response to the concentration of hydrogen in the exhaust gas supplied to the group of cylinders.

Figure 7:
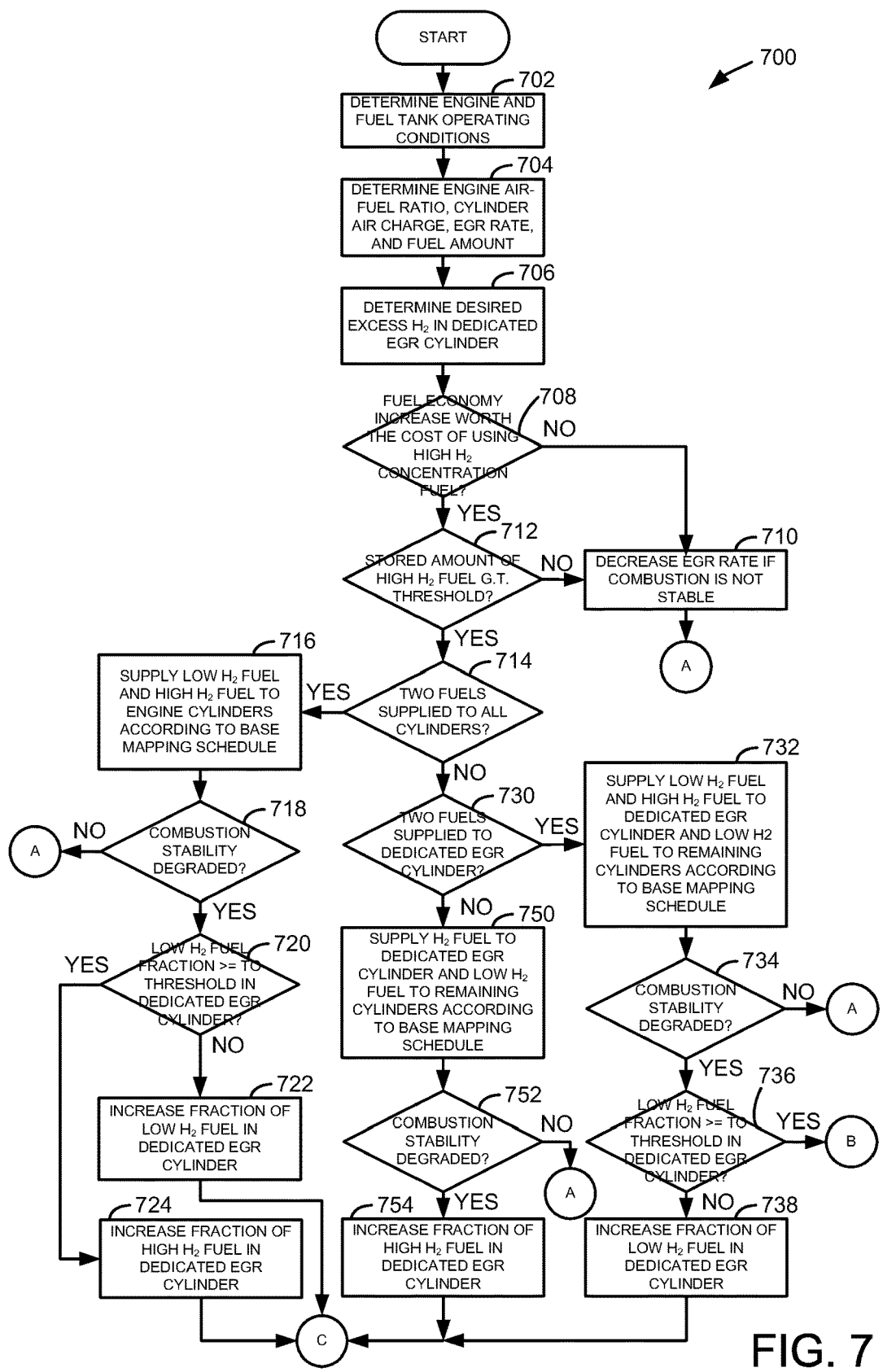
FIGS. 7 and 8 show an example method for improving combustion stability of an engine while operating the engine with higher cylinder charge dilution.
Figure 8:
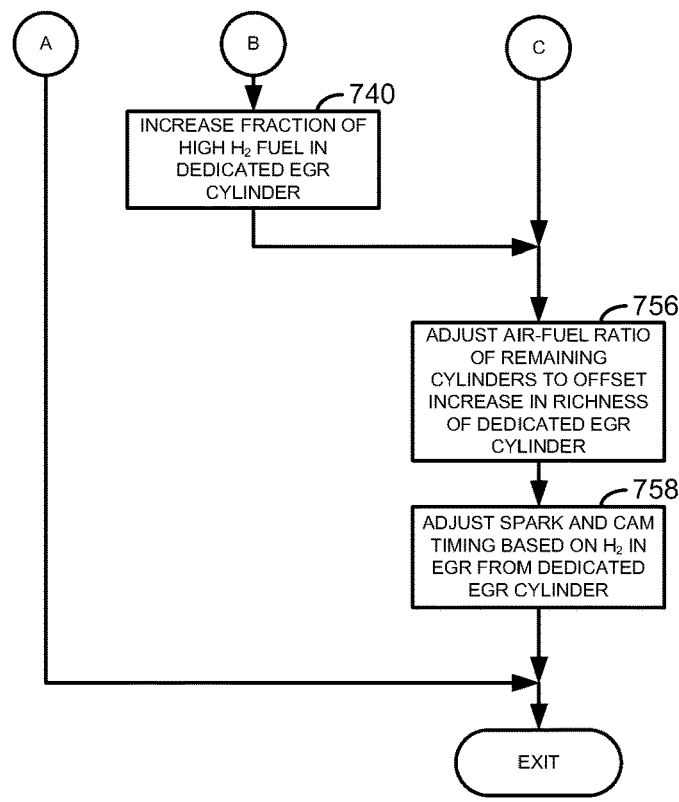

Referring now to FIGS. 7 and 8, a method for improving combustion stability of an engine operating with a high level of EGR dilution is shown. The method of FIGS. 7 and 8 may be included in a system as described in one or more of FIGS. 1-6. The method of FIGS. 7 and 8 may be stored as executable instructions in non-transitory memory of controller 12 shown in FIG. 1.

At 702, method 700 determines engine and fuel tank operating conditions. Engine conditions may include but are not limited to driver demand torque, engine speed, ambient temperature, ambient humidity, engine temperature, and air charge temperature. Fuel tank conditions may include but are not limited to fuel amount stored in low hydrogen concentration fuel storage tank, amount of fuel stored in high hydrogen concentration fuel storage tank, type of fuels stored in the high and low hydrogen fuel tanks, and cost of fuels stored in the low and high hydrogen concentration fuel tanks. In one example, a driver may input fuel cost and type information into a controller via a key pad or other device. In some examples, information regarding fuel type, cost, and composition may be received via wireless transmitter from a fuel station or the internet. Method 700 proceeds to 704 after engine and fuel tank information is determined.

At 704, method 700 determines the engine air-fuel ratio, cylinder air charge, EGR rate, and amount of fuel to inject to engine cylinders. In one example, driver demand torque is determined via an accelerator pedal position sensor. The driver demand torque may be interpreted as a desired engine torque, or alternatively, as a desired wheel torque and the desired wheel torque may be converted into a desired engine torque via multiplying the wheel torque by transmission and axle gear ratios. The desired engine torque and present engine speed are used to index a table or function that outputs a predetermined engine air flow rate or cylinder air amount in each cylinder per cylinder cycle. The cylinder air amount is an amount of air needed to provide the desired engine torque.

Similarly, the engine air-fuel ratio is determined via indexing tables and/or functions that output a desired air-fuel ratio. The desired air-fuel ratio may be modified by multipliers for engine temperature and air temperature to improve engine operation. The engine air flow rate or cylinder air amount is divided by the desired air-fuel ratio to determine the amount of fuel to inject to each engine cylinder. If two different fuels are supplied to the engine, the amounts or fractions of each fuel in a total amount of fuel being injected to the engine may be adjusted to achieve the desired air-fuel ratio (e.g., a stoichiometric air-fuel ratio) since the stoichiometric air-fuel ratio of the combined air-fuel mixture may be different than the stoichiometric air-fuel ratios of the respective fuels.

The base engine EGR flow rate is determined by indexing tables or functions that store predetermined engine EGR flow rates based on engine speed, engine load, and engine temperature. The base engine EGR rate may be an EGR flow rate for operating the engine with high EGR dilution (e.g., cylinder mass for a combustion cycle is greater than 20% EGR by mass) at selected engine speeds and loads. Method 700 proceeds to 706 after engine air-fuel ratio, EGR flow-rate, cylinder air amount, and amount of fuel per cylinder cycle is determined.

At 706, method 700 determines a desired amount of excess hydrogen in EGR gas provided by the dedicated EGR cylinder. In one example, a table or function stores empirically determined levels of hydrogen for nominal engine conditions where the EGR flow rate determined at 704 may be provided with a desired level of engine combustion stability. Engine combustion stability may be defined as the standard deviation of indicated mean effective cylinder pressure. A variation of more than 5% from the mean may be indicative of combustion stability issues. The table or function may output a hydrogen concentration, and the hydrogen concentration may be provided in the EGR from the dedicated EGR cylinder via indexing a table or function that outputs a cylinder air-fuel ratio based on desired hydrogen concentration and fuel type (e.g., gasoline, hydrogen, alcohol) and supplying fuel to the dedicated EGR cylinder for combustion. Method 700 proceeds to 708 after the desired excess hydrogen is determined.

At 708, method 700 judges if the fuel economy increase of operating the engine with a high EGR dilution level (e.g., the base EGR flow rate) is offset by the cost of combusting a higher hydrogen concentration fuel in the engine to allow the higher EGR dilution level. In one example, vehicle fuel economy for operating the vehicle at the higher EGR dilution level (e.g., the base EGR flow rate) is estimated. If the base EGR flow rate at the present operating conditions is low enough where combustion stability is at a desired level and no use of higher hydrogen concentration fuel is needed, the answer is yes and method 700 proceeds to 712. However, if higher hydrogen concentration fuel is injected at the present operating conditions to provide a desired level of combustion stability, the incremental cost of operating the engine with the higher concentration hydrogen is determined.

Specifically, the cost of operating the vehicle at present conditions is determined based on multiplying the cost of fuel (e.g., dollars per gallon including cost for one or more fuel types supplied to the engine) by the present fuel economy (e.g., gallons per mile). The cost of operating the vehicle using an increased amount of fuel to increase hydrogen concentration in the dedicated EGR cylinder is determined based on multiplying the cost of fuel (e.g., dollars per gallon including cost for one or more fuel types supplied to the engine), including the incremental fuel increase, by the estimated fuel economy (e.g., gallons per mile) of operating the engine with a greater EGR flow rate. The estimated fuel economy may be based on tables or functions that hold empirically determined vehicle fuel economy estimates based on present vehicle speed, driver demand torque, and EGR flow rate. If the cost of operating the vehicle with a higher EGR dilution level is greater than operating the engine with a lower EGR dilution level by more than a predetermined amount, the answer is no and method 700 proceeds to 710. Otherwise, the answer is yes and method 700 proceeds to 712.

At 710, method 700 decreases the EGR rate to a lower EGR rate if combustion is unstable. The EGR flow rate may be reduced to where the engine operates with a desired level of combustion stability without using the higher hydrogen concentration fuel. For example, an engine operating with 25% EGR may be adjusted to operate with 15% EGR. For example, the reduction in EGR may be achieved by directing a portion of exhaust gas from the dedicated EGR cylinder to the exhaust manifold instead of to the intake manifold. A position of a valve such as valve 205 may be adjusted to vary or reduce the external EGR amount. Method 700 proceeds to exit after the base EGR flow rate or amount of EGR in a cylinder per cylinder cycle is reduced to an EGR amount that supports a desired level of combustion stability without operating the engine with a higher hydrogen concentration fuel.

At 712, method 700 judges if the amount of higher hydrogen concentration fuel stored on board the vehicle is greater than (G.T.) a threshold amount of fuel. The amount of fuel stored in the higher hydrogen concentration fuel may be determined via a pressure sensor for gaseous fuels or via a float sensor for liquid fuels. If method 700 judges that the amount of higher hydrogen concentration fuel stored on board the vehicle is greater than a threshold level, the answer is yes and method 700 proceeds to 714. Otherwise, the answer is no and method 700 proceeds to 710.

At 714, method 700 judges if higher and lower hydrogen concentration fuels are supplied to or available to all engine cylinders. In one example, a bit in memory may be set if all cylinders may be supplied both higher and lower hydrogen concentration fuels. If method 700 judges that two fuels may be supplied to all engine cylinders (e.g., via the configuration of FIG. 3), the answer is yes and method 700 proceeds to 716. Otherwise, the answer is no and method 700 proceeds to 730.

At 716, method 700 supplies lower and higher hydrogen concentration fuels to the engine based a mapped schedule of fuels. In one example, the fuel map is based on engine torque, engine speed, and EGR flow rate. The fuel map specifies a fraction of total fuel that is injected to a cylinder that is a higher hydrogen concentration fuel and a fraction that is a lower hydrogen concentration fuel. Each cylinder may be supplied different fractions of higher and lower hydrogen concentration fuels. In some examples, the higher hydrogen fuel injection fractional amount may increase as engine load increases to suppress engine knock. Fuel is supplied to the engine's cylinders via opening fuel injectors and supplying the mapped fuel fractions to the cylinders in the amount of fuel determined at 704. Method 700 proceeds to 718 after fuel is supplied to the engine cylinders.

At 718, method 700 judges if combustion stability is degraded while supplying fuel and EGR according to the base schedule determined at 704. In one example, combustion stability may be estimated based on engine speed variation or based on output of cylinder pressure sensors. If cylinder pressure or engine speed varies by more than a threshold amount, it may be determined that combustion stability has degraded. If method 700 judges that combustion stability is degraded, the answer is yes and method 700 proceeds to 720. Otherwise, the answer is no and method 700 proceeds to exit.

At 720, method 700 judges if a fraction of lower hydrogen concentration fuel injected to the dedicated EGR cylinder is greater than a threshold amount for the present engine speed and torque demand. For example, the fractional limit of lower hydrogen concentration fuel may be 60% of the total mass of fuel injected at the present engine operating conditions. The fractional limit of lower hydrogen concentration fuel is used by method 700 to determine how much of the lower hydrogen concentration fuel may be injected to increase the exhaust gas hydrogen concentration before the amount of the higher hydrogen concentration fuel supplied to the dedicated EGR cylinder is increased. Thus, in this example, the lower hydrogen concentration fuel is increased until it reaches 60% of total mass and then the fraction of higher hydrogen concentration fuel in the total fuel mass is increased. In this way, the higher hydrogen concentration fuel may be conserved for conditions where combustion with higher EGR cylinder contents provides less combustion stability. If method 700 judges that a fraction of lower hydrogen concentration fuel injected to the dedicated EGR cylinder is greater than a threshold amount the answer is yes and method 700 proceeds to 724. Otherwise, the answer is no and method 700 proceeds to 722.

In alternative examples, the mass of lower hydrogen concentration fuel may be increased until a threshold mass of lower hydrogen concentration fuel is injected, then the mass of higher hydrogen concentration fuel injected is increased.

At 722, method 700 increases a fraction of lower hydrogen concentration fuel supplied to the dedicated EGR cylinder for each cylinder cycle. By increasing the fraction of lower hydrogen concentration fuel supplied to the dedicated EGR cylinder in a total amount of fuel supplied to the dedicated EGR cylinder, it may be possible to increase the amount of hydrogen in exhaust gas of the dedicated EGR cylinder by running richer than a stoichiometric air-fuel ratio. The exhaust gas containing a higher concentration of hydrogen may be directed to the engine's remaining cylinders as EGR. The additional hydrogen in the exhaust gas may improve combustion stability in the engine's remaining cylinders. Method 700 increases the hydrogen concentration of exhaust gas in the dedicated EGR cylinder by richening the air-fuel mixture combusted in the dedicated EGR cylinder. The air-fuel mixture in the dedicated EGR cylinder may be richened by a predetermined amount (e.g., 0.05 air-fuel ratio) each time combustion instability is determined over a predetermined time period. The air-fuel ratio in the dedicated EGR cylinder may be richer than stoichiometric conditions. Method 700 proceeds to 756 after the fractional amount of low hydrogen fuel supplied to the dedicated EGR cylinder is increased.

At 756, the air-fuel ratio of cylinders other than the dedicated EGR is adjusted to offset the richening of the dedicated EGR cylinder. In particular, the air-fuel ratio of engine cylinders receiving EGR from the dedicated EGR cylinder is leaned by a fractional amount corresponding to the amount of excess hydrogen (and carbon monoxide) in the exhaust gas re-circulated to engine cylinders other than the dedicated EGR cylinder.

For example, for a four cylinder engine having a single dedicated EGR cylinder, if the fuel in the dedicated EGR cylinder and fuel in the remaining cylinders have an equivalent stoichiometric air-fuel ratio and the air-fuel ratio in the dedicated EGR cylinder is richened from a stoichiometric air-fuel ratio by 1.5 air-fuel ratio, the air-fuel ratios in the remaining cylinders are leaned by 1.5/3 air-fuel ratios. By leaning air-fuel mixtures of cylinders receiving re-circulated exhaust gas from the dedicated EGR cylinder, the air-fuel mixture of the remaining cylinders may be near the desired air-fuel ratio of the respective remaining cylinders (e.g., stoichiometry).

In examples where a higher hydrogen concentration fuel is supplied to the dedicated EGR cylinder and a lower hydrogen concentration fuel is supplied to the remaining engine cylinders, the fuel injection amount of fuel injected to the remaining cylinders is decreased based on extent of enrichment of the higher hydrogen concentration fuel from the stoichiometric air-fuel ratio of the higher hydrogen concentration fuel and the stoichiometric air-fuel ratio of the fuel mixture that includes the higher and lower hydrogen concentration fuels. Method 700 proceeds to 758 after the respective air-fuel ratios of cylinders other than the dedicated EGR cylinder are adjusted.

At 758, method 700 adjusts engine spark timing and cam timing based on hydrogen in exhaust gas re-circulated to engine cylinders. In particular, internal EGR in cylinders other than the dedicated EGR cylinder may be increased as the hydrogen concentration in the exhaust gas from the dedicated EGR cylinder flowing to other engine cylinders is increased. The internal EGR of a cylinder may be increased by increasing the intake and exhaust valve overlap for the cylinder. In this way, internal EGR may be increased so that even higher overall EGR dilution levels may be provided. Similarly, if a supply of higher hydrogen concentration fuel becomes low, the internal EGR of cylinders other than the dedicated EGR cylinder may be decreased as the amount of hydrogen fuel combusted in the dedicated EGR cylinder is reduced. Further, the external EGR amount may be increased as the hydrogen concentration in the external EGR supplied by the dedicated EGR cylinder is increased. The external EGR amount may be increased via increasing the charge amount in the dedicated EGR to a greater charge amount than is in the other engine cylinders.

Supplying EGR having a higher hydrogen concentration to an engine cylinder may increase indicated mean effective pressure (IMEP) of the engine cylinder. Therefore, it may be desirable to increase spark retard from minimum spark for best torque (MBT) to maintain engine torque at a desired level. For example, if the engine is operated with a higher level of EGR charge dilution at idle, spark timing of one or more cylinders may be retarded so that engine speed is not increased as the hydrogen concentration in EGR supplied from the dedicated EGR cylinder to other engine cylinders is increased. Likewise, if the hydrogen concentration in EGR gas supplied from the dedicated EGR cylinder to other cylinders is decreased, spark timing of cylinders other than the dedicated EGR cylinder is advanced toward MBT spark timing to maintain engine torque as IMEP is reduced. Method 700 proceeds to exit after engine valve/cam timing and spark timing is adjusted for the hydrogen concentration in EGR gas supplied from the dedicated EGR cylinder to other engine cylinders.

It should be noted that hydrogen concentration in EGR gas may be determined via an intake hydrogen sensor or inferred from the fuel type and air-fuel ratio of fuel combusted in the dedicated EGR cylinder. In one example, a table stores empirically determined EGR hydrogen concentration values that are output to determine hydrogen concentration in EGR gas. The table is indexed based on the dedicated EGR cylinder's air-fuel ratio and type of fuel combusted.

At 724, method 700 increases a fraction of higher hydrogen concentration fuel supplied to the dedicated EGR cylinder for each cylinder cycle. By increasing the fraction of higher hydrogen concentration fuel supplied to the dedicated EGR cylinder in a total amount of fuel supplied to the dedicated EGR cylinder, it may be possible to increase the amount of hydrogen in exhaust gas of the dedicated EGR cylinder at a faster rate as compared to when a lower hydrogen concentration fuel is supplied to the dedicated EGR cylinder. The exhaust gas containing a higher concentration of hydrogen may be directed to the engine's remaining cylinders as external EGR. The additional hydrogen in the exhaust gas may improve combustion stability in the engine's remaining cylinders. Method 700 increases the hydrogen concentration of exhaust gas in the dedicated EGR cylinder by richening the air-fuel mixture combusted in the dedicated EGR cylinder. The air-fuel mixture in the dedicated EGR cylinder may be richened by a predetermined amount (e.g., 0.05 air-fuel ratio) by supplying the higher hydrogen concentration fuel to the dedicated EGR cylinder. Method 700 proceeds to 756 after the fractional amount of low hydrogen fuel supplied to the dedicated EGR cylinder is increased.

At 730, method 700 judges if two fuels (e.g., a higher hydrogen concentration fuel and a lower hydrogen concentration fuel) are supplied to the dedicated EGR cylinder. In one example, method 700 may judge if two fuels are supplied to the dedicated EGR cylinder based on a value or state of a bit or variable in memory. The bit or variable may be set to a value of one if the engine includes a supply of two fuels to the dedicated EGR cylinder. If method 700 judges that two fuels are supplied to the engine's dedicated EGR cylinder, the answer is yes and method 700 proceeds to 732. Otherwise, the answer is no and method 700 proceeds to 750.

At 732, method 700 supplies lower and higher hydrogen concentration fuels to the dedicated EGR cylinder based a mapped schedule of fuels. The fuel map may be based on engine torque, engine speed, and EGR flow rate. The fuel map specifies a fraction of total fuel that is injected to a cylinder that is a higher hydrogen concentration fuel and a fraction that is a lower hydrogen concentration fuel. In some examples, the higher hydrogen fuel injection fractional amount may increase as engine EGR flow rate increases. Method 700 supplies low concentration hydrogen fuel to the engine cylinders other than the dedicated EGR cylinder. The amount of lower hydrogen concentration fuel supplied to the engine cylinders other than the dedicated EGR cylinder may be based on engine speed, torque demand, and desired air-fuel ratio. Fuel is supplied to the engine's cylinders via opening fuel injectors and supplying the mapped fuel fractions to the respective cylinders in the amount of fuel determined at 704. Method 700 proceeds to 734 after fuel is supplied to the engine cylinders.

At 734, method 700 judges if combustion stability is degraded while supplying fuel and EGR according to the base schedule described at 704. If cylinder pressure or engine speed varies by more than a threshold amount, it may be determined that combustion stability has degraded. If method 700 judges that combustion stability is degraded, the answer is yes and method 700 proceeds to 736. Otherwise, the answer is no and method 700 proceeds to exit.

At 736, method 700 judges if a fraction of lower hydrogen concentration fuel injected to the dedicated EGR cylinder is greater than a threshold amount for the present engine speed and torque demand. The fractional limit of lower hydrogen concentration fuel is used by method 700 to first increase hydrogen in the EGR gas produced by the dedicated EGR cylinder via the lower hydrogen concentration fuel. In this way, the higher hydrogen concentration fuel may be conserved for conditions where combustion with higher EGR cylinder contents provides less combustion stability. If method 700 judges that a fraction of lower hydrogen concentration fuel injected to the dedicated EGR cylinder is greater than a threshold amount the answer is yes and method 700 proceeds to 740. Otherwise, the answer is no and method 700 proceeds to 738.

At 738, method 700 increases a fraction of lower hydrogen concentration fuel supplied to the dedicated EGR cylinder for each cylinder cycle. By increasing the fraction of lower hydrogen concentration fuel supplied to the dedicated EGR cylinder in a total amount of fuel supplied to the dedicated EGR cylinder, it may be possible to increase the amount of hydrogen in exhaust gas of the dedicated EGR cylinder by increasing fuel enrichment in that cylinder. The exhaust gas containing a higher concentration of hydrogen may be directed to the engine's remaining cylinders as EGR. The additional hydrogen in the exhaust gas may improve combustion stability in the engine's remaining cylinders. Method 700 increases the hydrogen concentration of exhaust gas in the dedicated EGR cylinder by richening the air-fuel mixture combusted in the dedicated EGR cylinder. The air-fuel mixture in dedicated EGR cylinder may be richened by a predetermined amount. Method 700 proceeds to 756 after the fractional amount of low hydrogen fuel supplied to the dedicated EGR cylinder is increased.

At 740, method 700 increases a fraction of higher hydrogen concentration fuel supplied to the dedicated EGR cylinder for each cylinder cycle. By increasing the fraction of higher hydrogen concentration fuel supplied to the dedicated EGR cylinder in a total amount of fuel supplied to the dedicated EGR cylinder, it may be possible to increase the amount of hydrogen in exhaust gas of the dedicated EGR cylinder at a faster rate as compared to when a lower hydrogen concentration fuel is supplied to the dedicated EGR cylinder. The exhaust gas containing a higher concentration of hydrogen may be directed to the engine's remaining cylinders as external EGR. The additional hydrogen in the exhaust gas may improve combustion stability in the engine's remaining cylinders. Method 700 increases the hydrogen concentration of exhaust gas in the dedicated EGR cylinder by richening the air-fuel mixture combusted in the dedicated EGR cylinder. The air-fuel mixture in dedicated EGR cylinder may be richened by a predetermined amount (e.g., 0.05 air-fuel ratio) when combustion instability is detected by supplying the higher hydrogen concentration fuel to the engine. Method 700 proceeds to 756 after the fractional amount of low hydrogen fuel supplied to the dedicated EGR cylinder is increased.

At 750, method 700 supplies only higher hydrogen concentration fuel to the dedicated EGR cylinder based a mapped schedule of fuels. The fuel map may be based on engine torque, engine speed, and EGR flow rate. The fuel map specifies an amount of higher hydrogen concentration fuel that is injected to the dedicated EGR cylinder. The amount of higher hydrogen concentration fuel supplied to the dedicated EGR cylinder may be based on engine speed, desired engine torque, and desired cylinder air-fuel ratio. Method 700 supplies lower hydrogen concentration fuel to the engine cylinders other than the dedicated EGR cylinder. The amount of lower hydrogen concentration fuel supplied to the engine cylinders other than the dedicated EGR cylinder may be based on engine speed, torque demand, and desired air-fuel ratio. Fuel is supplied to the engine's cylinders via opening fuel injectors and supplying the mapped fuel fractions to the respective cylinders in the amount of fuel determined at 704. Method 700 proceeds to 734 after fuel is supplied to the engine cylinders.

At 752, method 700 judges if combustion stability is degraded while supplying higher hydrogen concentration fuel to the engine. If cylinder pressure or engine speed varies by more than a threshold amount, it may be determined that combustion stability has degraded. If method 700 judges that combustion stability is degraded, the answer is yes and method 700 proceeds to 754. Otherwise, the answer is no and method 700 proceeds to exit.

At 754, method 700 increases a fraction of higher hydrogen concentration fuel supplied to the dedicated EGR cylinder for each cylinder cycle. By increasing the amount of higher hydrogen concentration fuel supplied to the dedicated EGR cylinder, it may be possible to increase the amount of hydrogen in exhaust gas of the dedicated EGR cylinder so that combustion stability in other engine cylinders may be improved when exhaust gas from the dedicated EGR cylinder is provided to the other engine cylinders. The exhaust gas containing a higher concentration of hydrogen (e.g., the dedicated EGR cylinder) may be directed to the engine's remaining cylinders as EGR. The additional hydrogen in the exhaust gas may improve combustion stability in the engine's remaining cylinders. Method 700 increases the hydrogen concentration of exhaust gas in the dedicated EGR cylinder by richening the air-fuel mixture combusted in the dedicated EGR cylinder. The air-fuel mixture in dedicated EGR cylinder may be richened by a predetermined amount (e.g., 0.05 air-fuel ratio) by supplying the higher hydrogen concentration fuel to the engine. The air-fuel ratio in the dedicated EGR cylinder may be richer than a stoichiometric air-fuel ratio. Method 700 proceeds to 756 after the fractional amount of low hydrogen fuel supplied to the dedicated EGR cylinder is increased.

Thus, the method of FIGS. 7 and 8 provides for an engine operating method, comprising: injecting a lower hydrogen concentration fuel to a group of cylinders; and increasing a fuel injection amount of a higher hydrogen concentration fuel to one or more dedicated EGR cylinders in response to combustion stability in the group of cylinders being less than a desired combustion stability. The method includes where the lower hydrogen concentration fuel has a lower hydrogen concentration than the higher hydrogen concentration fuel.

In some examples, the method includes where higher hydrogen concentration fuel is supplied solely to the one or more dedicated EGR cylinders. The method includes where the lower hydrogen concentration is supplied solely to the group of cylinders. The method further comprises externally supplying exhaust gas to the group of cylinders solely from the one or more dedicated EGR cylinders. The method further comprises adjusting an exhaust gas recirculation amount of the group of cylinders in response to a hydrogen concentration in the exhaust gas supplied to the group of cylinders solely from the one or more dedicated EGR cylinders.

In another example, the method of FIGS. 7 and 8 provides for an engine operating method, comprising: injecting a lower hydrogen concentration fuel to a group of cylinders; flowing exhaust gas from one or more dedicated EGR cylinders not in the group of cylinders to the group of cylinders; increasing a hydrogen concentration in the exhaust gas from the one or more dedicated EGR cylinders via injecting a higher hydrogen concentration fuel to the one or more dedicated EGR cylinders in response to combustion stability of a cylinder in the group of cylinders; and adjusting spark timing of the group of cylinders in response to a hydrogen concentration in the exhaust gas from the one or more dedicated EGR cylinders. The method further comprises increasing an internal exhaust gas recirculation amount in each cylinder of the group of cylinders in response to the hydrogen concentration.

In some examples, the method further comprises retarding spark timing in each cylinder of the group of cylinders in response to the hydrogen concentration. The method includes where the higher hydrogen concentration fuel is injected solely to the one or more dedicated EGR cylinders. The method includes where the higher hydrogen concentration fuel is injected all engine cylinders. The method includes where the group of cylinders receive exhaust external from the group of cylinders solely from the one or more dedicated EGR cylinders. The method includes where a fresh charge of the one or more dedicated EGR cylinders is greater than a fresh charge in cylinders in the group of cylinders. The method includes where external exhaust gas supplied to the cylinder group is supplied solely via the cylinder not in the cylinder group and is greater than thirty percent of charge in each cylinder in the cylinder group.

As will be appreciated by one of ordinary skill in the art, method described in FIGS. 7 and 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An operating method for an engine-driven vehicle, comprising:
   injecting a lower hydrogen concentration fuel to a group of cylinders;
   operating the vehicle in a first operating condition that includes a cost of operating the vehicle with a higher EGR dilution level being greater than a cost of operating the vehicle with a lower EGR dilution level by more than a predetermined amount;
   in response to a determination that the vehicle is operating in the first operating condition, decreasing a flow rate of EGR from one or more dedicated EGR cylinders to the group of cylinders relative to a base EGR rate in response to combustion stability in the group of cylinders being less than a desired combustion stability;
   operating the vehicle in a second operating condition that includes the cost of operating the vehicle with the higher EGR dilution level not being greater than the cost of operating the vehicle with the lower EGR dilution level by more than the predetermined amount; and
   in response to a determination that the vehicle is operating in the second operating condition,
      increasing a fuel injection amount of a higher hydrogen concentration fuel to the one or more dedicated EGR cylinders in response to combustion stability in the group of cylinders being less than the desired combustion stability;
      providing EGR from the one or more dedicated EGR cylinders to the group of cylinders at the base EGR rate; and
      increasing an internal EGR amount in each cylinder of the group of cylinders as a hydrogen concentration in exhaust gas flowing from the one or more dedicated EGR cylinders to the group of cylinders increases.

2. The method of claim 1, where the lower hydrogen concentration fuel has a lower hydrogen concentration than the higher hydrogen concentration fuel, where the one or more dedicated EGR cylinders are not in the group of cylinders, and further comprising, in response to the determination that the vehicle is operating in the first operating condition, maintaining injection of the lower hydrogen concentration fuel and not injecting the higher hydrogen concentration fuel.

3. The method of claim 1, where the higher hydrogen concentration fuel is supplied solely to the one or more dedicated EGR cylinders.

4. The method of claim 1, where the lower hydrogen concentration fuel is supplied solely to the group of cylinders.

5. The method of claim 1, further comprising externally supplying exhaust gas to the group of cylinders solely from exhaust gas of the one or more dedicated EGR cylinders, and wherein decreasing the flow rate of EGR from the one or more dedicated EGR cylinders to the group of cylinders relative to the base EGR rate comprises adjusting a position of an EGR valve to increase a fraction of exhaust gas from the one or more dedicated EGR cylinders that is directed to an exhaust manifold coupled to the group of cylinders and a converter positioned downstream of the exhaust manifold.

6. The method of claim 5, further comprising adjusting an EGR amount of the group of cylinders in response to the hydrogen concentration in the exhaust gas supplied to the group of cylinders solely from the one or more dedicated EGR cylinders.

7. An engine operating method, comprising:
   injecting a lower hydrogen concentration fuel to a group of cylinders and injecting both the lower hydrogen concentration fuel and a higher hydrogen concentration fuel to one or more dedicated EGR cylinders, which are not included in the group of cylinders, according to a base mapping schedule;
   adjusting a timing and/or a lift amount of intake and exhaust valves of the one or more dedicated EGR cylinders to increase a fresh charge provided to the one or more dedicated EGR cylinders relative to a fresh charge provided to cylinders of the group of cylinders;

flowing exhaust gas from the one or more dedicated EGR cylinders to the group of cylinders;

increasing a hydrogen concentration in the exhaust gas from the one or more dedicated EGR cylinders via adjusting a ratio of the higher hydrogen concentration fuel to the lower hydrogen concentration fuel injected to the one or more dedicated EGR cylinders in response to combustion stability of a cylinder in the group of cylinders, the ratio adjusted relative to the base mapping schedule;

adjusting spark timing of the group of cylinders in response to the hydrogen concentration in the exhaust gas from the one or more dedicated EGR cylinders; and adjusting an internal EGR amount in each cylinder of the group of cylinders based on the hydrogen concentration in the exhaust gas from the one or more dedicated EGR cylinders, including increasing the internal EGR amount as the hydrogen concentration increases and decreasing the internal EGR amount as the hydrogen concentration decreases.

8. The method of claim 7, further comprising retarding spark timing in each cylinder of the group of cylinders in response to an increase in the hydrogen concentration in the exhaust gas from the one or more dedicated EGR cylinders and advancing spark timing in each cylinder of the group of cylinders in response to a decrease in the hydrogen concentration in the exhaust gas from the one or more dedicated EGR cylinders.

9. The method of claim 7, where the higher hydrogen concentration fuel is injected solely to the one or more dedicated EGR cylinders.

10. The method of claim 7, where each cylinder of the group of cylinders and the one or more dedicated EGR cylinders include a respective higher hydrogen concentration fuel injector, and where the higher hydrogen concentration fuel is injected to each cylinder via the respective higher hydrogen concentration fuel injector.

11. The method of claim 7, where the group of cylinders receives exhaust external from the group of cylinders solely from the one or more dedicated EGR cylinders.

12. The method of claim 7, where external exhaust gas supplied to the group of cylinders is supplied solely via the one or more dedicated EGR cylinders and is greater than twenty percent of charge in each cylinder of the group of cylinders.

13. A vehicle system, comprising:
an engine;
a first fuel tank storing a lower hydrogen concentration fuel;
a second fuel tank storing a higher hydrogen concentration fuel;
a group of fuel injectors supplying the lower hydrogen concentration fuel to a group of cylinders;
one or more fuel injectors supplying the higher hydrogen concentration fuel to one or more dedicated EGR cylinders not in the group of cylinders; and
a controller including non-transitory instructions for:
increasing a concentration of hydrogen in exhaust gas supplied to the group of cylinders via adjusting relative amounts of the higher hydrogen concentration fuel and the lower hydrogen concentration fuel supplied to the one or more dedicated EGR cylinders, including, in response to determining that a fraction of the lower hydrogen concentration fuel injected to the one or more dedicated EGR cylinders is greater than a threshold amount for current engine speed and torque demand, increasing a fraction of the higher hydrogen concentration fuel supplied to the one or more dedicated EGR cylinders, and, in response to determining that the fraction of the lower hydrogen concentration fuel injected to the one or more dedicated EGR cylinders is not greater than the threshold amount for the current engine speed and torque demand, increasing the fraction of the lower hydrogen concentration fuel supplied to the one or more dedicated EGR cylinders; and adjusting a timing and/or a lift amount of intake and exhaust valves of the one or more dedicated EGR cylinders to increase a fresh charge provided to the one or more dedicated EGR cylinders relative to a fresh charge provided to cylinders of the group of cylinders.

14. The vehicle system of claim 13, where the one or more dedicated EGR cylinders is the sole way of supplying exhaust gas recirculation externally to the group of cylinders, and further comprising instructions for supplying only the lower hydrogen concentration fuel or both the higher hydrogen concentration fuel and the lower hydrogen concentration fuel to each cylinder of the group of cylinders according to a base mapping schedule, regardless of whether the fraction of the lower hydrogen concentration fuel injected to the one or more dedicated EGR cylinders is greater than the threshold amount or not greater than the threshold amount.

15. The vehicle system of claim 13, further comprising instructions for adjusting spark timing in response to the concentration of hydrogen in the exhaust gas supplied to the group of cylinders.

16. The vehicle system of claim 13, further comprising an intake manifold coupled to the engine and a passage allowing pneumatic communication between the one or more dedicated EGR cylinders and the intake manifold, the passage not allowing pneumatic communication between the intake manifold and the group of cylinders.

17. The vehicle system of claim 13, further comprising instructions for adjusting internal exhaust gas recirculation in the group of cylinders in response to the concentration of hydrogen in the exhaust gas supplied to the group of cylinders.

18. The vehicle system of claim 15, wherein the instructions for adjusting spark timing in response to the concentration of hydrogen in the exhaust gas supplied to the group of cylinders comprise instructions for retarding spark timing of one or more cylinders of the group of cylinders as the concentration of hydrogen in the exhaust gas supplied to the group of cylinders increases and advancing spark timing of one or more cylinders of the group of cylinders as the concentration of hydrogen in the exhaust gas supplied to the group of cylinders decreases.

* * * * *